Patented Oct. 6, 1936

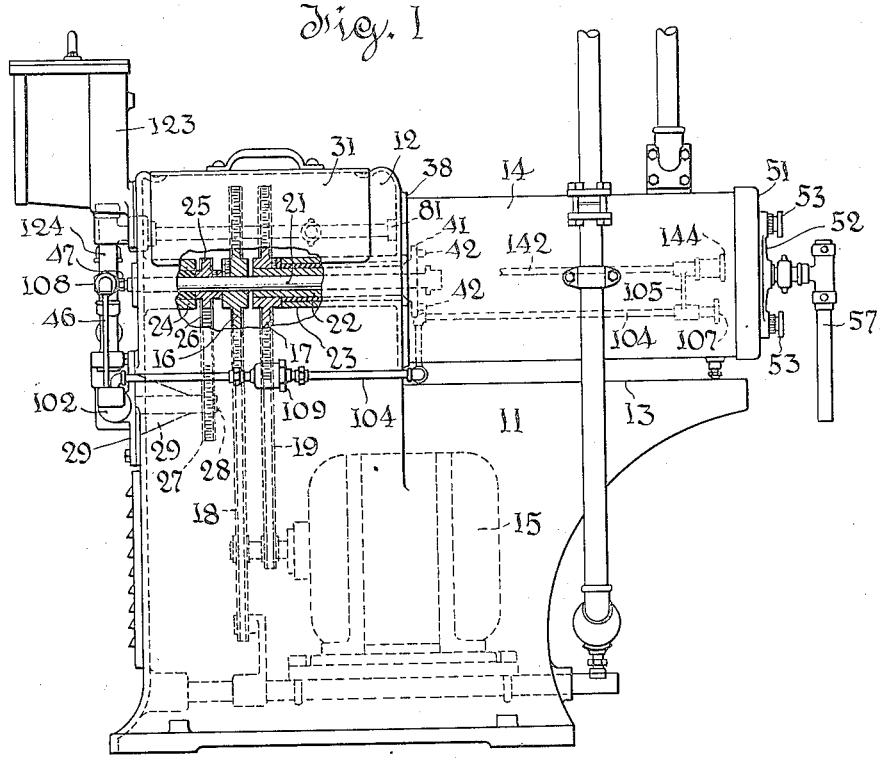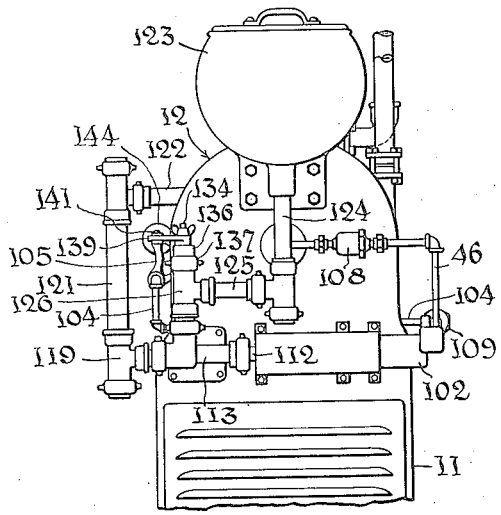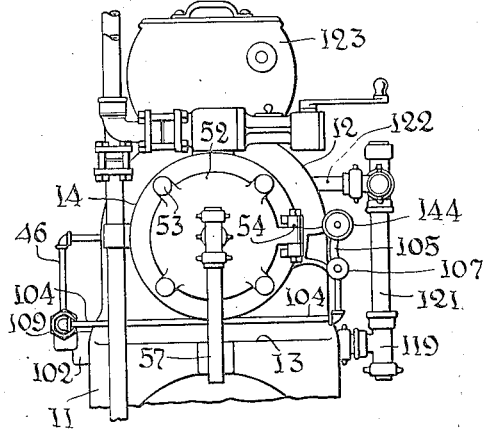

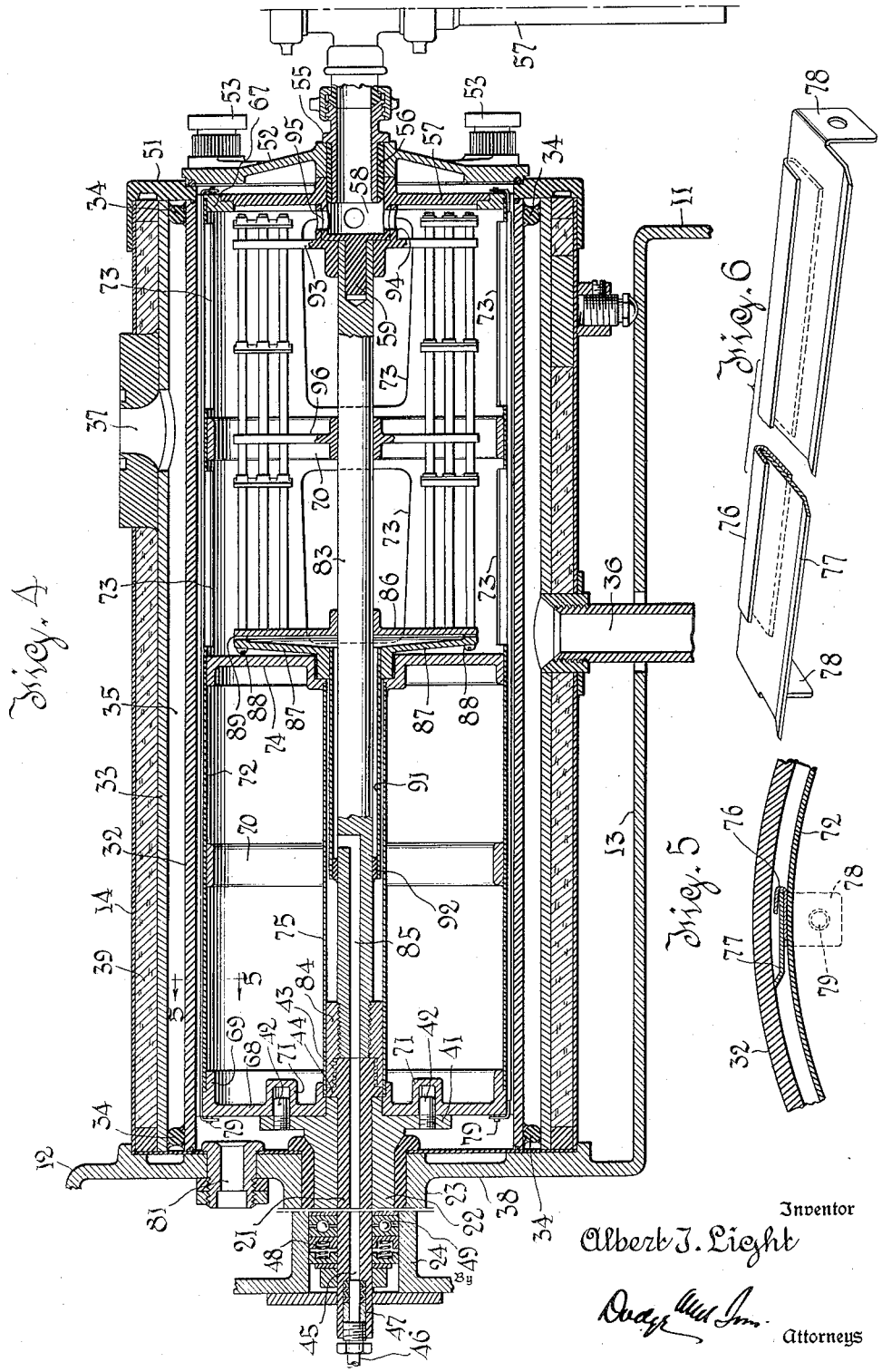

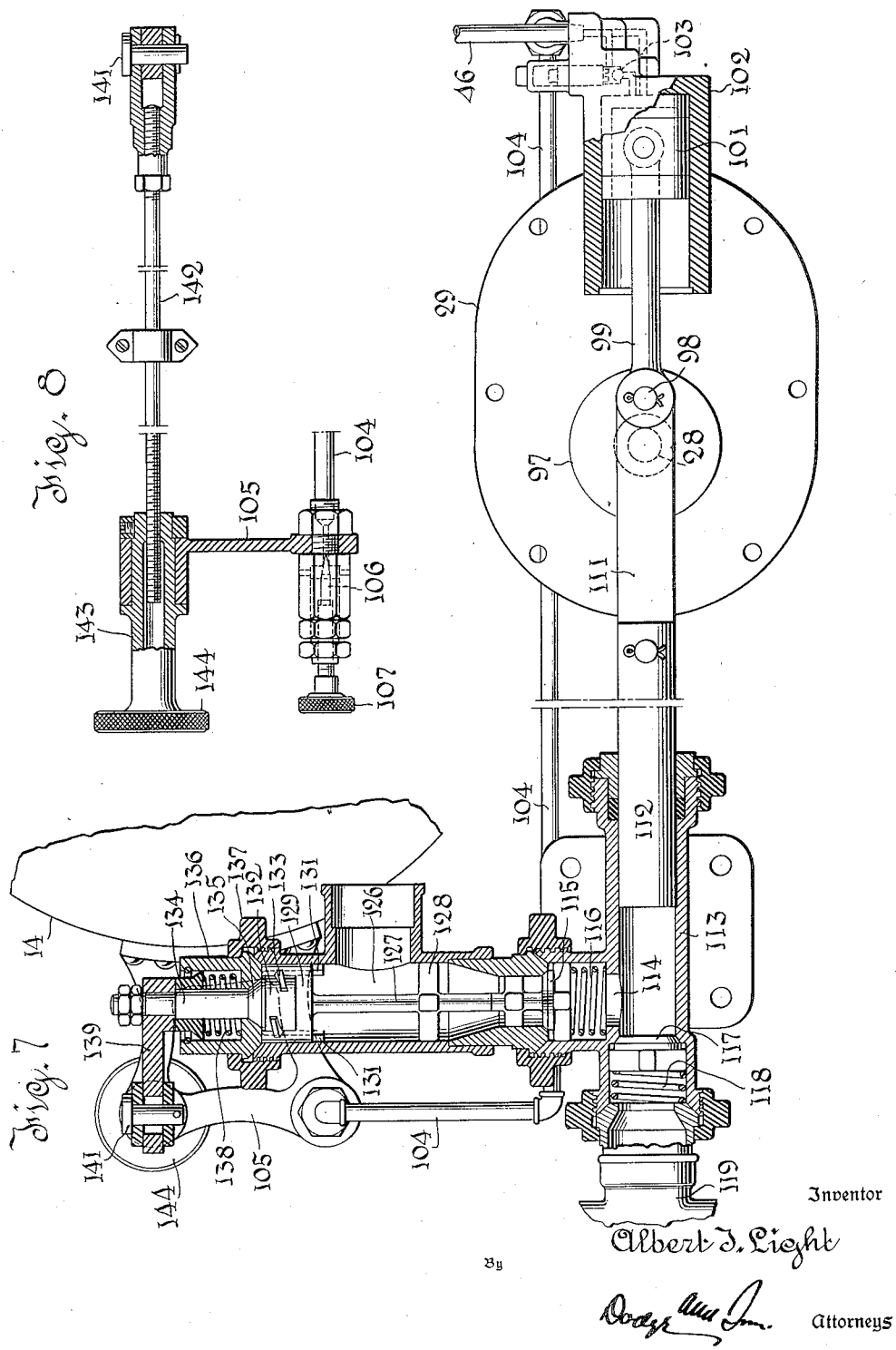

2,056,432

UNITED STATES PATENT OFFICE 2,056,432

FREEZING ICE CREAM AND THE LIKE

Albert T. Light, York, Pa., assignor to York Ice Machinery Corporation, York, Pa., a corporation of Delaware Application December 14, 1932, Serial No. 647,266
Renewed May 18, 1935

23 Claims. (Cl. 62—114)

This invention relates to apparatus for continuously freezing ice cream and the like.

In the following description the term "mix" will be used as a generic term to define the liquid to be treated. The machine hereinafter disclosed is not limited in its utility strictly to the treatment of cream.

In continuous freezers, as heretofore constructed, and particularly in the so-called "custard" machines, it has been common practice to inject the mix and air under pressure at the same point, and commonly through the same nozzle. From the time of introduction the mix is whipped or violently agitated to incorporate the air with the mix, the temperature of the mix being gradually reduced throughout this process by means of an envelope or jacket maintained at a freezing temperature.

In a related application to which the present application is subordinate, there is described and claimed an improved method in which the mix is injected by a pump or other suitable means and caused to pass over a refrigerated surface, which abstracts heat from the mix until the temperature falls at least to what is known as the latent heat point. The latent heat point is that temperature at which the mix commences to change from the liquid to the solid state and at which heat is abstracted without further reduction of temperature as the mix changes from the liquid to the solid state.

During cooling to the latent heat point, the mix is not whipped or violently agitated but is merely scraped from the refrigerated surface to permit the use of low temperatures without the possibility of accumulating a film or coating of frozen mix on such refrigerated surface.

When the temperature of the mix has been reduced to or substantially to the latent heat point, a compressed gas, preferably air, is injected into the chilled mix, and at the same time the mix is subjected to a violent whipping or beating action. During this second or whipping stage the abstraction of heat is continued so that during the incorporation of air in the mix the solidification continues progressively. By using rotary whippers, and drawing the discharge from the center, a centrifugal separation will occur, so that only aerated substantially frozen mix will discharge from the second stage.

By the two-stage operation above described, it is commercially practicable to produce ice cream and similar frozen products, with any desired degree of overrun and with a texture which renders the product suitable for discharge into the conventional hardening cans, or discharge to any other suitable hardening treatment.

The present application is directed to a freezer mechanism peculiarly adapted to carry out the two-stage process just described, but not limited to such use.

The advantage inherent in the process described is decided. When the air is injected with the mix the mix is not in a favorable condition for the incorporation of air. Consequently much useless beating occurs, some of the air becomes segregated and is not incorporated, and the product is not uniform. The injection of the air after the mix has reached the latent heat point avoids this difficulty, for at that temperature the mix whips readily and all the air injected is incorporated. In this way an absolutely uniform product is secured. Furthermore, the first or cooling stage is more rapid because of the absence of agitation.

An economic advantage of the structure described in the present application is that an ordinary ice cream freezer of the cylinder batch type can be converted to continuous operation merely by substituting a new drive shaft for one of the whipper driving shafts of the batch freezer, substituting a new whipper structure and closure for those characteristic of the batch freezer and by the application of the necessary air and mix pumps with suitable drives for the pumps and suitable discharge connections from the pumps to the cylinders. This permits the conversion of existing batch freezers to a form suited for continuous operation. Also it renders a number of important parts usable interchangeably for either of the two types of freezer, for each of which there is a substantial commercial demand. It results that existing equipment can readily be converted and that the stock of parts required to permit manufacture and servicing of two types of freezers, can be greatly reduced.

A preferred embodiment of the invention will now be described in connection with the accompanying drawings, in which,—

Fig. 1 is a side elevation of a complete continuous freezer with a portion of the casing broken away and a portion of the drive mechanism shown in section.

Fig. 2 is a fragmentary elevation of the rear end thereof (left hand end as viewed in Fig. 1).

Fig. 3 is a fragmentary elevation showing the front end thereof (right hand end as viewed in Fig. 1).

Fig. 4 is a vertical axial section through the cylinder and jackets of the freezer shown in Fig.

1, the parts being drawn on a greatly enlarged scale.

Fig. 5 is a fragmentary section on the line 5—5 of Fig. 4.

Fig. 6 is a perspective view of a scraper and the retaining notch therefor, with parts broken away.

Fig. 7 is a vertical axial section on an enlarged scale showing the pump mechanism.

Fig. 8 is a fragmentary view showing the manually adjustable means for controlling the action of the air pump and the mix pump.

The freezer is supported on a pedestal or base 11 which is hollow and is provided with a gear case or housing 12 and a shelf portion 13, above which latter the cylinder structure is mounted. In Fig. 1 the cylinder is indicated generally by the numeral 14 applied to the envelope. The freezer is driven by an electric motor 15 which is indicated in dotted lines and which is housed within the base 11. This motor drives two sprockets 16 and 17 by means of two chains 18 and 19, the chains being so arranged and the sprockets being so dimensioned that the sprockets 16 and 17 turn in opposite directions and preferably at equal angular velocities. The particular drive mechanism is not material to the invention and is not illustrated in detail. Commercial machines embodying it are in extensive use so that it will be familiar to those skilled in the art.

The sprocket 16 is fast on an inner shaft 21 and the sprocket 17 is fast on the quill shaft 22 which encircles the shaft 21. The quill shaft 22 turns in a main bearing 23 while the inner shaft 21 is further supported by a bearing 24. Fixed on the shaft 21 between the bearing 24 and the sprocket 16 is a small sprocket 25 which drives through a chain 26 a sprocket 27 fast on a shaft 28. The shaft 28 turns in a removable bearing bracket 29 bolted to the base 11. The shaft 28 drives the pump mechanism hereinafter described, and the addition of the sprockets 25, 27, chain 26 and bracket 29 with shaft 28, represent the entire change necessary in the driving mechanism of a known type of batch freezer. Access to the drive mechanism mounted in the housing 12 is afforded by means of a removable cover 31 (see Fig. 1).

The quill shaft 22 is one of the shafts used in a batch freezer to drive one of the reversely rotating elements of the conventional scraping and whipping mechanisms. The inner shaft 21 is similar to the second shaft used in a batch freezer to drive the other element of the whipping mechanism but differs from the conventional shaft in two respects. It is provided with a longitudinal air port and it is provided with a threaded head for connection with the whipping mechanism of the continuous freezer, as will be hereinafter more fully explained.

Referring now to Fig. 4, the cylinder structure comprises an inner shell 32, which serves as the refrigerated wall of the freezer cylinder, an outer wall 33, and annular heads 34 which fill the space between the shells 32 and 33 at their ends, and thus with the shells enclose a jacket space 35 in which the refrigerant is evaporated or through which it is circulated.

While it is practicable to circulate refrigerated brine or a similar heat convector through the jacket space 35, it is preferred to use what is known as direct expansion, that is, a system in which liquid volatile refrigerant, such as anhydrous ammonia, is introduced through a connection 36, and evaporated refrigerant is withdrawn at a definite suction pressure through a connection 37.

The temperature developed in the jacket 35 is controlled by controlling the suction pressure, as is well understood in the art. A convenient arrangement for admitting and discharging the liquid refrigerant to put the freezer into and out of effective operation when desired, is that described and claimed in the patent to Zieber 1,866,991, July 12, 1932.

The cylinder is closed at its rear (left hand) end by a head 38 through which the shafts 21 and 22 project. The shell 33 is encircled by any suitable thermal insulation, indicated at 39, and this is enclosed by the envelope 14 already mentioned.

As has been stated, the quill shaft 22 projects through the head 38 and within the cylinder the shaft terminates in a hub having a peripheral flange 41 provided with driving pins 42. The inner shaft 21 projects through the quill shaft and terminates in the threaded hub 43 with shoulder or flange 44. The shaft 21 is provided with a longitudinal passage or duct 45 to which the discharge pipe 46 leading from the air pump, hereinafter described, is connected by means of a packing gland of conventional form indicated at 47. This gland permits the shaft 21 to rotate relatively to the pipe 46 and at the same time maintains a tight joint between the pipe and the shaft. Leakage around and through the quill shaft is precluded by the spring-pressed sealing rings 48 and the axial thrust developed by the pressure in the freezer cylinder is taken by a ball thrust bearing 49.

The forward end of the cylinder carries a ring 51 to which is hinged a closure 52 somewhat similar to the closures used with batch freezers but having a central discharge port and no supply passage.

The head 52 is held closed by a plurality of clamping screws 53 of known form and is hinged to the ring 51, as indicated at 54 in Fig. 3. The hinge lugs are slotted so that the head may first be withdrawn bodily outward to clear the dasher structure, hereinafter described, and may then be swung to one side. The use of such slotted hinge lugs is common in the batch freezer art.

The head 52 is provided with a central discharge aperture in which is fixed a tubular discharge fitting 55 and an encircling bushing 56. The bore of the fitting 55 leads to any suitable discharge connection, indicated at 57. The one shown in the drawings is that customarily used to discharge into hardening cans.

Rotatably mounted on the bearing bushing 56 is a disk 57 which is formed with a hub portion 58 projecting into the cylinder, the hub portion 58 terminating in a pivot or journal 59 intended to support the whipper. The periphery of the disk 57 forms a stepped joint with the annulus 67 which carries the forward end of a barrel structure equipped with scrapers. The rear end of the barrel structure comprises a disk 68 with peripheral flange 69. The disk 68 encircles the hub on the end of the quill shaft 22, seats against the flange 41, and is provided with sockets 71 to receive the driving pins 42. Connecting the annulus 67 and the flange 69 is a cylindrical sleeve or shell 72 which is imperforate for approximately half of its length toward the flange 69, i. e., at the rear of the freezing cylinder, and which is formed with large apertures 73 in the other half of its length, that is, the half adjacent the forward end of the freezing cylinder. The sleeve 72 is stiffened by internal annuli 70 and at its midlength is stiffened and closed by a disk 74 apertured at its center and connected at its center with the center of the disk 68 by means of an imperforate tube 75.

Mounted on the outer surface of the sleeve 72 are a number of scrapers, four being a suitable number. These scrapers coact with substantially the entire length of the inner surface of the shell 32 and may be of any suitable form, but I prefer a flexible scraper which is the invention of another and which is illustrated in Figs. 5 and 6. The scraper comprises a flexible blade of stainless steel seated at its rear edge in a notch carried by the sleeve 72. This notch takes the form of a long folded strip of sheet metal 76 which is attached in any suitable manner to the sleeve 72 and which extends the entire distance from the annulus 67 to the flange 69. The scraper blade is indicated by the numeral 77 applied to its leading edge, and is retained in place by laterally bent end tongues 78 which are apertured to snap over studs 79 mounted respectively in the flange 69 and annulus 67. The function of these blades is to scrape the interior of the shell 32 clear of frozen mix as the sleeve 72 rotates. The mix enters the cylinder through a fitting 81 in the rear head 38. This fitting is connected with the discharge of the mix pump, hereinafter described. The mix entering through the fitting 81 is constrained to flow through the interval between the shell 32 and the sleeve 72 and in its traverse over the first half of the sleeve 72 rotates with the sleeve in contact with the shell 32. Its temperature is thus rapidly reduced but there is relatively little agitation since the mix rotates with the sleeve, the scraper removing any frozen mix which tends to adhere to the shell 32. After moving half the length of the cylinder, that is, after passing beyond the plane of the disk 74, the mix is free to enter the interior of the sleeve 72 by way of the apertures 73. By passing through the apertures 73 it comes into range of action of the whipper structure which will now be described.

The whipper structure is supported and driven by a central shaft 83 which terminates at its rear end in a hub member 84 designed to screw upon the threaded hub 43 of the shaft 21 and to seat against its flange 44. The shaft 83 is provided with an axial port 85 which communicates directly with the axial port 45 in shaft 21 and terminates on the outer face of shaft 83.

Mounted on the hub 83 just forward of the disk 74 is a disk 86, and connected to this disk at its periphery is a second dished disk 87 which is spaced a slight distance from the shaft 83 at its center. The peripheral connection between the disks 86 and 87 is made by means of a plurality of screws 88 passing through bosses 89, the effect being to produce a narrow and almost continuous peripheral discharge port leading from the chamber between the disks 86 and 87. This chamber between the disks 86 and 87 is connected to the passage 85 by means of a tube 91 which encircles the shaft 83, is sealed to the central aperture of disk 87, and is sealed to the shaft 83, as indicated at 92. It follows that air entering through the discharge pipe 46 flows through the axial port 45 in shaft 21, and through the axial port 85 in shaft 83, through the space between shaft 83 and tube 91 to the space between the disks 86 and 87, and discharges through the peripheral interval between these two disks.

Consequently the discharging air impinges on the cooled mix just as this issues from between the sleeve 72 and the shell 32, and starts to move into the whipping zone by passing through the apertures 73. The shaft 83 turns at its forward end on the journal 59, as clearly shown in Fig. 4, and carries a cruciform spider 93. The spider 93 is formed with a hub or flange 94 which encircles the hub 58 on disk 57. These two mating parts are formed with a plurality of ports 95 which register periodically as the disk 57 and the spider 93 rotate in reverse directions. They thus control the discharge to the discharge nipple 55.

The wipping is performed by four groups of three bars each, all bars extending between the disk 86 and the spider 93. There are three bars carried by each arm of the cruciform spider. In order to steady the bars they are further sustained at midlength by a cruciform spider 96.

The pump mechanism is equipped with means for controlling the rate of supply of mix and the rate of supply of compressed air, and will now be described.

The shaft 28 projects to a point external to the base 11 and there carries a disk 97 provided with a crank pin 98. This pin is connected by a pitman 99 with a trunk piston 101 which works in the air pump cylinder 102. The air pump is thus of the single acting type. It is provided with inlet and discharge valves of the ball check type, the discharge valve being indicated in dotted lines at 103. The inlet valve is identical in form and since the use of ball check valves is common in air pumps, it is not deemed necessary to illustrate the inlet valve in detail. The supply of air to the inlet valve passes through a pipe 104 which extends to the forward end of the machine and is there supported in a bracket 105. The admission of air to the pipe 104 is controlled by a needle valve 106 which is adjustable by a knurled head 107.

The quantity of air delivered by the air pump is controlled by throttling the intake of air by means of the needle valve 106. The discharge pipe of the pump leads through the pipe 46, already mentioned, to the port 45 in shaft 21. A filter 108 is interposed in pipe 46 and a filter 109 is interposed in pipe 104.

Crank pin 98 also drives through a second pitman 111, plunger 112 of the single-acting mix pump. The cylinder of this pump is indicated at 113 and is provided with an inlet passage 114 controlled by an automatic inlet valve of the poppet type, 115. This valve is urged in a seating direction by a compression coil spring 116 and the action of the pump is controlled by holding the valve 115 from its seat more or less by mechanism which will be hereinafter described. The discharge valve from the cylinder 113 is also of the poppet type and is indicated at 117. It is held seated by a coil compression spring 118. Mix discharging past the valve 117 flows through the connection 119, pipes 121 and 122, to the connection 81.

The mix flows from a reservoir 123 supported by the housing 12, through pipe 124, and pipe 125, to the inlet fitting 126 above the valve 115. In this fitting is mounted a thrust rod 127 which at its lower end is in thrust engagement with the pilot of inlet valve 115. The rod 127 is guided by a spider 128 and carries at its upper end a forked yoke 129. This yoke is held against rotation by the longitudinal splines 131 and may be shifted axially by the rotation of a cam hub 132 which carries the thread like cams 133. The cams 133 engage the yoke 129, as clearly indicated in the drawings.

The rotary hub 132 is fast on a shaft 134 and has a conical sealing surface 135 which mates with a guiding member 136. This last is held in place by union nut 137, the parts being so arranged that all the movable parts may be readily removed for cleaning. The same is true of all the pipe fittings on the mix line, but in this detail they follow conventional design.

Sealing engagement of the conical surface 135 is provided by compression coil spring 138. The rotation of the shaft 134 is effected by swinging the lever 139. The lever 139 is pinned at 141 to a reach rod 142. The rod 142 is threaded at its forward end in a nut 143, the nut being swiveled in the bracket 145, already described. The nut 143 may be turned by the knurled head 144. Thus rotation of the knurled head 144 turns the cam 132 and shifts the thrust member 127 up or down according to the direction of rotation of the head 144, to vary the amount that the valve 115 is held from its seat. The partial unseating of the valve 115 allows a part of the mix to be displaced back to the reservoir 123 on the discharge stroke of the plunger 112. If the valve 115 is allowed to seat the entire quantity of mix is displaced past valve 117. If the valve 115 is partially unseated, part of the mix flows back to the reservoir and only the remainder is discharged past the valve 117.

In operation the suction pressure is ordinarily maintained constant to establish a desired freezing temperature in the jacket 35, but it is obvious that the suction pressure may be adjusted within ordinary limits to vary the freezing temperature in the jacket 35. If the freezing temperature is maintained constant the machine is controlled solely by adjusting the knobs 107 and 144. The knob 144 determines the rate at which the mix is supplied through the nipple 81 and consequently the rate at which the mix flows along the sleeve 72. The rate of supply is preferably but not necessarily so adjusted that when the mix reaches the apertures 73, at which point air is supplied and whipping commences, it will have been reduced in temperature to or substantially to the latent heat point. Adjustment of the knob 107 controls the rate at which air is discharged from between the peripheries of disks 86 and 87. Since all of the air so discharged is whipped into the mix control of the rate of supply of air controls the degree of overrun. This commonly is of the order of 95 to 100 per cent. but may, so far as the operation of the machine is concerned, be substantially higher.

It will be observed that in the operation of the machine, the mix is first subjected to progressive cooling, without violent agitation but with scraping, and in this stage is reduced to the latent heat point or below. At the completion of this operation, air is discharged into the mix, and the discharge is so located that the jets of air impinge directly on the mix producing an initial mingling of the air and mix. Immediately thereafter the mix and air are violently whipped together and this whipping occurs in heat exchanging relation with the jacket 32. Since the whippers are rotary there is a centrifugal selection between the unaerated mix and the aerated mix, and this selection is favorable to the outflow of the aerated mix through the discharge connections already described.

While I have described the mechanism in considerable detail, it is obvious that modifications may be made within the scope of the invention. The above description therefore is to be taken as illustrative rather than limiting. The scope of the invention is defined in the claims.

What is claimed is:—

1. The combination of a refrigerated cylinder having an inlet port at one end for the injection of mix and having a central discharge port at the other end; a rotatable barrel mounted in said cylinder adjacent said inlet port, said barrel, defining with the walls of said cylinder, throughout a portion of the length of the latter, a narrow flow passage through which the mix flows; rotary whipping means mounted in said cylinder adjacent the discharge end thereof and adapted to act upon mix flowing from said passage toward said discharge port; and means for introducing compressed gas into said mix as it issues from said narrow passage.

2. The combination of a refrigerated cylinder having an inlet port at one end for the injection of mix and having a central discharge port at the other end; a rotatable barrel mounted in said cylinder adjacent said inlet port, said barrel, defining with the walls of said cylinder, throughout a portion of the length of the latter, a narrow flow passage through which the mix flows; rotary whipping means mounted in said cylinder adjacent the discharge end thereof and adapted to act upon mix flowing from said passage toward said discharge port; and means for injecting compressed gas into said mix, said means comprising a passage formed through said whipper.

3. The combination of a refrigerated cylinder having an inlet port at one end for the injection of mix and having a central discharge port at the other end; a rotatable barrel mounted in said cylinder adjacent said inlet port, said barrel, defining with the walls of said cylinder, throughout a portion of the length of the latter, a narrow flow passage through which the mix flows; rotary whipping means mounted in said cylinder adjacent the discharge end thereof and adapted to act upon mix flowing from said passage toward said discharge port; and means for injecting compressed gas into said mix, said means comprising a passage formed through said whipper and discharging at the periphery thereof adjacent the discharge end of said narrow passage.

4. The combination with a continuous ice cream freezer, including means for chilling the mix and whipping means arranged to act on the mix after it has been partially chilled thereby, of means for furnishing compressed gas to the mix undergoing treatment, said means comprising ports formed in the whipper structure.

5. The combination with a continuous ice cream freezer, including whipping means, of means for furnishing compressed gas to the mix undergoing treatment, said means comprising ports formed in the whipper structure and discharging at the periphery thereof.

6. The combination with an ice cream freezer of the type having a refrigerated zone through which the mix passes and in which the mix is refrigerated without substantial agitation, and a zone in which the mix is whipped while being further refrigerated, of means associated with said whipper, for injecting a compressed gas into said mix as it moves from the first to the second of said zones.

7. The combination of a continuous ice cream freezer having a whipper through the zone of action of which the mix flows continuously; and means comprising ports in said whipper for injecting compressed gas into the mix as the mix approaches the zone of action of the whipper.

8. The combination of a refrigerated cylinder having a closed end and an open end; a removable closure for said open end; a pair of concentric differentially rotating shafts projecting into the closed end of said cylinder; a barrel connected to be driven by one of said shafts and arranged to be supported thereby and by said closure, said barrel defining with the cylinder and adjacent the closed end thereof, a slender annular flow path; a whipper structure driven by the other of said shafts, and sustained by said other shaft and said closure, said whipper structure extending substantially from the termination of said slender flow path to a point adjacent said closure; means for feeding mix to said slender flow path adjacent the closed end of said cylinder; and means for supplying compressed gas to the mix issuing from said slender flow path.

9. The combination of a refrigerated cylinder having a closed end and an open end; a removable closure for said open end; a pair of concentric differentially rotating shafts projecting into the closed end of said cylinder; a barrel connected to be driven by one of said shafts and arranged to be supported thereby and by said closure, said barrel defining with the cylinder and adjacent the closed end thereof, a slender annular flow path; a whipper structure driven by the other of said shafts, and sustained by said other shaft and said closure, said whipper structure extending substantially from the termination of said slender flow path to a point adjacent said closure; means for feeding mix to said slender flow path adjacent the closed end of said cylinder; and means for supplying compressed gas to the mix issuing from said slender flow path, said means comprising ports formed in the rotary whipper.

10. A whipper structure for ice cream freezers, comprising a rotary shaft; a sustaining member carried by said shaft; and whipping rods carried by said sustaining member, there being formed in said shaft and through the said sustaining member, a discharge passage for delivering compressed gas through the peripheral portion of such sustaining member.

11. In a continuous freezer, the combination of means forming a slender elongated passage and a substantially cylindrical whipping chamber, said passage communicating with said chamber near the periphery of the latter; means for refrigerating said passage and the peripheral wall of said whipping chamber; means for feeding mix through said passage to said whipping chamber; rotary whipping means in the whipping chamber; means for injecting gas into the mix in the whipping chamber; and means comprising a discharge opening substantially at the center of rotation of the whipper for causing the mix to flow inward through the whipper to the center thereof and then discharge from the freezer without further agitation.

12. In a continuous freezer, the combination of means forming a slender elongated passage and a substantially cylindrical whipping chamber, said passage communicating with said chamber near the periphery of the latter; means for refrigerating said passage and the peripheral wall of said whipping chamber; means for feeding mix through said passage to said whipping chamber; scraping means operating in said passage and chamber; rotary whipping means in the whipping chamber; means for injecting gas into the mix in the whipping chamber; and means comprising a discharge opening substantially at the center of rotation of the whipper for causing the mix to flow inward through the whipper to the center thereof and then discharge from the freezer without further agitation.

13. In a continuous freezer, the combination of means forming a slender elongated passage and a substantially cylindrical whipping chamber, said passage communicating with said chamber near the periphery of the latter; means for refrigerating said passage and the peripheral wall of said whipping chamber; means for feeding mix through said passage to said whipping chamber; scraping means operating in said passage and chamber; rotary whipping means in the whipping chamber; means for injecting gas into said mix as it issues from said passage into said whipping chamber; and means comprising a discharge opening substantially at the center of rotation of the whipper for causing the mix to flow inward through the whipper to the center thereof and then discharge from the freezer without further agitation.

14. In a continuous freezer, the combination of means forming a slender elongated passage and a substantially cylindrical whipping chamber, said passage communicating with said chamber near the periphery of the latter; means for refrigerating said passage and the peripheral wall of said whipping chamber; means for feeding mix through said passage to said whipping chamber; scraping means operating in said passage and chamber; rotary whipping means in the whipping chamber; means associated with said whipping means for injecting gas into said mix as it initially encounters said whipping means; and means comprising a discharge opening substantially at the center of rotation of the whipper for causing the mix to flow inward through the whipper to the center thereof and then discharge from the freezer without further agitation.

15. In a continuous freezer, the combination of a cylindrical chamber; means for refrigerating the peripheral wall of said chamber; a rotary element having means for scraping said wall, said element arranged to define together with the walls of said cylindrical chamber a narrow annular cooling passage and a whipping space in communication at its periphery therewith; rotary whipping means in said space and substantially coaxial with said chamber; means for feeding mix through said passage to said space; and discharging means at the center of rotation of said whipper arranged to receive mix flowing inward through said whipper and discharge the same without substantial further agitation.

16. In a continuous freezer, the combination of a cylindrical chamber; means for refrigerating the peripheral wall of said chamber; a rotary element having means for scraping said wall, said element arranged to define together with the walls of said cylindrical chamber a narrow annular cooling passage and a whipping space in communication at its periphery therewith, rotary whipping means in said space and substantially coaxial with said chamber; means for injecting a gas into said mix near the periphery of said space; means for feeding mix through said passage to said space; and discharging means at the center of rotation of said whipper arranged to receive mix flowing inward through said whipper and discharge the same without substantial further agitation.

17. In a continuous freezer, the combination of a cylindrical chamber; means for refrigerating the peripheral wall of said chamber; a rotary element having means for scraping said wall, said element arranged to define together with the walls of said cylindrical chamber a narrow annular cooling passage and a whipping space in communication at its periphery therewith; a rotary whipping means in said space and substantially coaxial with said chamber; means for discharging gas into the mix through said whipper at points adjacent the junction of said cooling passage and whipping space; means for feeding mix through said passage to said space; and discharging means at the center of rotation of said whipper arranged to receive mix flowing inward through said whipper and discharge the same without substantial further agitation.

18. The combination of a cylindrical chamber; means for refrigerating the peripheral walls of said chamber; a rotary barrel defining with the cylindrical walls of said chamber a thin annular flow passage coextensive with a portion of the length of said cylinder; rotary whipping means approximately coextensive with the remainder of the length of said cylinder; means for forcing mix through said thin annular flow passage into the zone of action of said whipper; scraping means for the walls of said cylinder; and a single driving means for said barrel and said whipper.

19. The combination of a cylindrical chamber; means for refrigerating the peripheral walls of said chamber; a rotary barrel defining with the cylindrical walls of said chamber a thin annular flow passage coextensive with a portion of the length of said cylinder; rotary whipping means approximately coextensive with the remainder of the length of said cylinder; means for forcing mix through said thin annular flow passage into the zone of action of said whipping means; scraping means for the walls of said cylinder; a single driving means for said barrel and said whipping means; and means for injecting air into said cylindrical chamber and comprising discharge ports located adjacent the discharge end of said annular flow passage.

20. A scraping and whipping unit for use with batch freezers of the cylinder type to convert the same to continuous operation, said unit comprising a barrel and a whipper unit which conjointly occupy substantially the entire length of the freezer cylinder, the barrel forming with the cylinder a narrow annular flow passage; scraping means for the cylinder walls carried by the barrel; and driving connections for the barrel and whipper unit arranged to engage the whipper driving connections of a batch freezer.

21. The combination of a refrigerated cylinder having an inlet port at one end for the injection of mix and having a central discharge port at the other end; a rotatable barrel mounted in said cylinder adjacent said inlet port, said barrel, defining with the walls of said cylinder, throughout a portion of the length of the latter, a narrow flow passage through which the mix flows; at least one scraper carried by said barrel, and arranged to scrape the cylinder as the barrel rotates; and rotary whipping means mounted in said cylinder adjacent the discharge end thereof and adapted to act upon mix flowing from said passage toward said discharge port.

22. The combination of a refrigerated cylinder having an inlet port at one end for the injection of mix and having a central discharge port at the other end; a rotatable barrel mounted in said cylinder adjacent said inlet port, said barrel, defining with the walls of said cylinder, throughout a portion of the length of the latter, a narrow flow passage through which the mix flows; at least one scraper carried by said barrel, and arranged to scrape the cylinder as the barrel rotates; rotary whipping means mounted in said cylinder adjacent the discharge end thereof and adapted to act upon mix flowing from said passage toward said discharge port; and means for introducing compressed gas into said mix as it flows between said inlet and discharge ports.

23. A scraping and whipping unit for use with batch freezers of the cylinder type to convert the same to continuous operation, said unit comprising a barrel, and a concentric whipper structure which are arranged end to end and conjointly occupy substantially the entire length of the freezer cylinder, the barrel being adapted to form with a portion of the freezing cylinder a narrow flow passage; scraping means for the cylinder carried by the barrel; and driving means for said unit adapted to engage the driving connections of such batch freezer.

ALBERT T. LIGHT.